US009235715B1

(12) United States Patent
Bailey et al.

(10) Patent No.: US 9,235,715 B1
(45) Date of Patent: Jan. 12, 2016

(54) TECHNIQUES FOR INCREASING MOBILE DEVICE SECURITY

(71) Applicant: EMC Corporation, Hopkinton, MA (US)

(72) Inventors: Daniel Bailey, Pepperell, MA (US); Irina Furman, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 1 day.

(21) Appl. No.: 14/134,746

(22) Filed: Dec. 19, 2013

(51) Int. Cl.
*H04L 29/06* (2006.01)
*G06F 21/60* (2013.01)

(52) U.S. Cl.
CPC .................................... *G06F 21/602* (2013.01)

(58) Field of Classification Search
CPC .................................................... G06F 21/602
See application file for complete search history.

(56) References Cited

U.S. PATENT DOCUMENTS

| | | | | | |
|---|---|---|---|---|---|
| 5,465,084 | A | * | 11/1995 | Cottrell | 340/5.27 |
| 6,572,025 | B1 | * | 6/2003 | Nishikado et al. | 235/494 |
| 8,881,251 | B1 | * | 11/2014 | Hilger | 726/7 |
| 8,943,609 | B2 | * | 1/2015 | Yun | 726/28 |
| 2006/0174339 | A1 | * | 8/2006 | Tao | G06F 21/36 726/18 |
| 2008/0136587 | A1 | * | 6/2008 | Orr | 340/5.31 |
| 2010/0287382 | A1 | * | 11/2010 | Gyorffy et al. | 713/185 |
| 2012/0005173 | A1 | * | 1/2012 | Esler | 707/698 |
| 2012/0084734 | A1 | * | 4/2012 | Wilairat | 715/863 |
| 2012/0109843 | A1 | * | 5/2012 | Hao | G06Q 30/0282 705/347 |
| 2013/0145448 | A1 | * | 6/2013 | Newell | 726/7 |
| 2013/0318598 | A1 | * | 11/2013 | Meacham | 726/19 |
| 2014/0133713 | A1 | * | 5/2014 | Kim et al. | 382/118 |
| 2014/0145821 | A1 | * | 5/2014 | Wang | 340/5.54 |
| 2014/0250522 | A1 | * | 9/2014 | Wang | G06F 3/04883 726/17 |
| 2014/0344896 | A1 | * | 11/2014 | Pak et al. | 726/4 |

OTHER PUBLICATIONS

Tao, Hai. Pass-Go, a new graphical password scheme. Diss. University of Ottawa, 2006.*

\* cited by examiner

*Primary Examiner* — Shawnchoy Rahman
(74) *Attorney, Agent, or Firm* — Ryan, Mason & Lewis, LLP (57) ABSTRACT

Methods, apparatus and articles of manufacture for increasing mobile device security are provided herein. A method includes establishing a pre-determined set of cryptographic information, wherein said pre-determined set of cryptographic information comprises one or more user-selected non-alphanumeric input elements applied to one or more visual components; generating a prompt via a computing device interface in connection with an authentication request to access a protected resource associated with the computing device; processing input cryptographic information entered via the computing device interface in response to the prompt against the pre-determined set of cryptographic information; and resolving the authentication request based on said processing.

20 Claims, 11 Drawing Sheets

TECHNIQUES FOR INCREASING MOBILE DEVICE SECURITY

FIELD

The field relates generally to cryptography, and more particularly to mobile device security.

BACKGROUND

Many mobile phones and other mobile devices in the current marketplace commonly offer the ability to use a numeric personal identification number (PIN) to unlock the device or otherwise enable some portion of device functionality. Such a security provision can prevent some rudimentary attackers from maliciously accessing the contents of the device. However, users commonly dislike PINs and also have a tendency to forget the PINs associated with their respective devices.

Additionally, the level of security afforded by a numeric PIN can be limited. A traditional four-digit PIN can take one of 10,000 different values. At first glance, one might expect, for example, needing to attempt 5000 guesses before successfully finding the correct PIN. However, this would be true only if PINs were randomly generated, and usability concerns generally result in most systems and devices permitting users to manually select their own PIN (which is very unlikely to be selected in a random fashion).

Accordingly, relying on the user to generate the PIN trades security for usability. With traditional alphanumeric passwords, dictionary attacks result largely from the observation that some PINs are chosen often by users. For example, 123456 is commonly identified as a commonly-chosen (six-digit) password. In addition, a user often resorts to basing a PIN on obvious personal information, such as a year in which he or she was born or experienced another significant life event such as marriage or birth of a child.

This deficiency in existing security approaches with respect to mobile devices is often reflected in a metric referred to as entropy. Accordingly, a need exists for techniques that add entropy and/or otherwise increase security measures in connection with mobile devices.

SUMMARY

One or more illustrative embodiments of the present invention provide techniques for increasing mobile device security. In accordance with an aspect of the invention, a method is provided comprising the steps of: establishing a pre-determined set of cryptographic information, wherein said pre-determined set of cryptographic information comprises one or more user-selected non-alphanumeric input elements applied to one or more visual components; generating a prompt via a computing device interface in connection with an authentication request to access a protected resource associated with the computing device; processing input cryptographic information entered via the computing device interface in response to the prompt against the pre-determined set of cryptographic information; and resolving the authentication request based on said processing.

In accordance with another aspect of the invention, a method is provided comprising the steps of: determining each of multiple non-alphanumeric input elements to be associated with one or more authentication requests to access a protected resource associated with a computing device; determining a visual component upon which the multiple non-alphanumeric input elements are to be applied in connection with said one or more authentication requests; and displaying the multiple non-alphanumeric input elements and the visual component via an interface of the computing device. The method additionally comprises processing input cryptographic information entered via the computing device interface, wherein said input cryptographic information comprises: selection of one or more of the multiple non-alphanumeric input elements; and identification of one or more regions of the visual component upon which the one or more selected non-alphanumeric input elements are to be applied. Further, the method comprises establishing said input cryptographic information as a pre-determined set of cryptographic information to be used in connection with a subsequent authentication request to access a protected resource associated with the computing device.

The techniques of the illustrative embodiments described herein overcome one or more of the problems associated with the conventional techniques described previously, and provide enhanced mobile device security capabilities. These and other features and advantages of the present invention will become more readily apparent from the accompanying drawings and the following detailed description.

DETAILED DESCRIPTION

As will be described herein, the present invention, in one or more illustrative embodiments, provides techniques for increasing mobile device security. At least one embodiment of the invention includes implementing a graphical password style that enhances the security and usability of a device. For example, and as further detailed herein, a user can be queried to assign a color from a limited palette to each of a number of presented and/or identified regions of a visual shape and/or theme. One or more embodiments of the invention additionally include taking into account the order in which the regions are colored.

Accordingly, such an embodiment of the invention can be implemented, for instance, as an access control provision in a personal computing device such as a mobile phone. Such a provision can be configured to authenticate a physically present user before usage. As ubiquitous devices such as mobile phones are particularly prone to loss or theft, such a provision can prevent strangers from accessing sensitive data contained within the device.

Additionally, without loss of generality, example embodiments of the invention described herein are directed to mobile phones. However, it is to be appreciated that the techniques detailed herein can be applied to any platform with a display and the ability for the user to direct spatial inputs to the device (for example, via a touch screen, a pointing device such as a mouse or touchpad, etc.).

Accordingly, the term "communication system," as used herein, is intended to be broadly construed so as to encompass any type of system in which multiple processing devices can communicate with one another. Also, the term "computing device," as used herein, is intended to be construed broadly so as to encompass any type of processing device that incorporates, among other things, cryptographic functionality (such as a computer, tablet, server, mobile telephone or device, smart phone, radio-frequency identification (RFID) tag or reader, authentication token, etc.). Similarly, the term "authentication server" should be understood to encompass any type of processing device or set of such devices that is operative to authenticate a password provided by an authentication token or other type of computing device. As used herein, an authentication server need not be a network-based server, and may be implemented as a portion of a device that performs other functions, as a combination of multiple servers or other devices, or in other forms.

Also, cryptographic information, as used herein, is intended to include passwords, answers to life questions, or other authentication credentials, or values derived from such authentication credentials, or more generally any other information that a user may be required to submit in order to obtain access to an access-controlled application such as a key. As described herein, in accordance with at least one embodiment of the invention, cryptographic information can include a key stored and/or protected within data (for example, user-related data) selected from local memory on a user mobile device. By way of further example, such a cryptographic key can be used for encryption, decryption, hash-based message authentication code (HMAC) operations, and/or signature operations. Additionally, as used herein, a combination code includes any form of secret sequence of characters, numbers, colors, pictures, etc.

Figure 1:
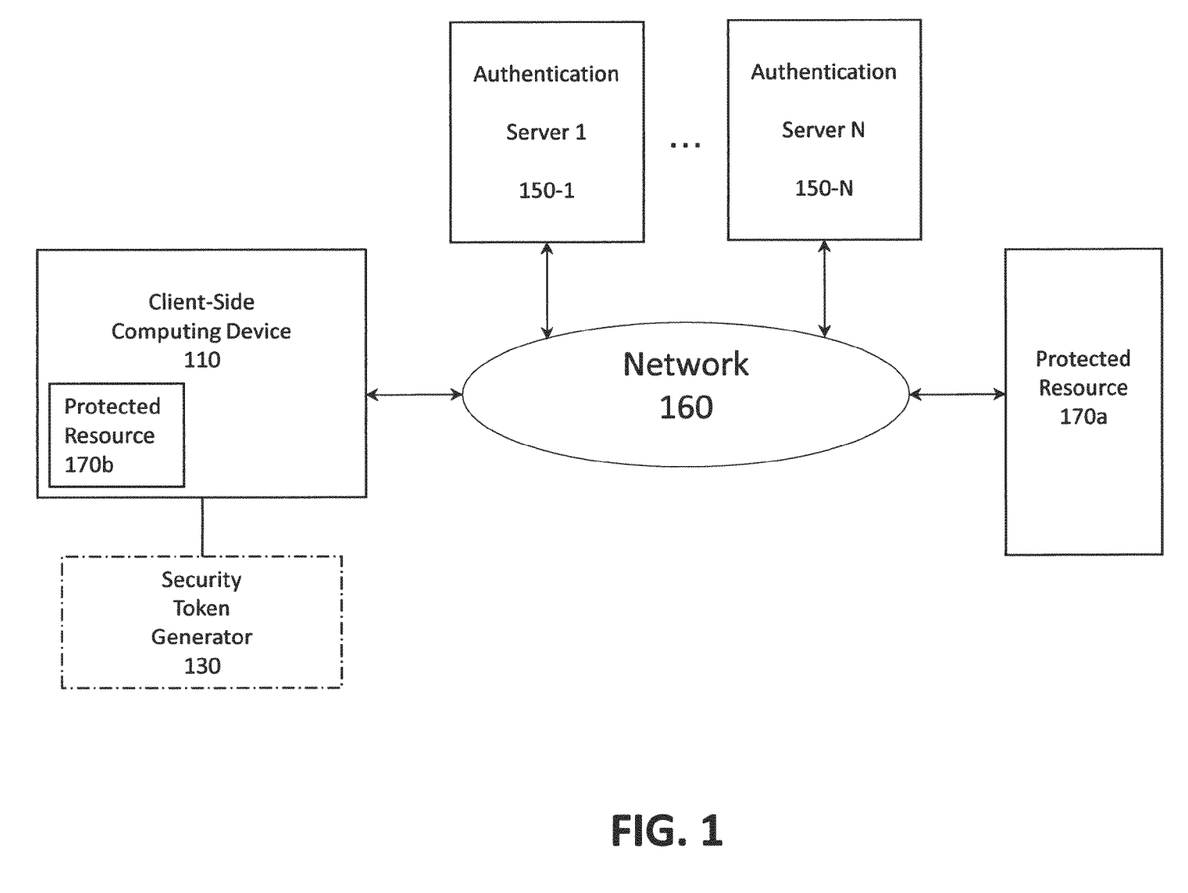
FIG. 1 is a diagram illustrating an example network environment in which one or more embodiments of the present invention can operate.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to protected resource 170a and/or 170b (hereinafter, collectively referred to as protected resource 170 unless otherwise specified).

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated using a password (which can also be referred to herein, in accordance with one or more embodiments of the invention, as a combination code) generated by the security token generator 130 by authentication servers 150. The exemplary communications among the system elements 110, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of some components are shown in the example system diagram of FIG. 1 for clarity of illustration.

The security token 130 is shown in FIG. 1 as being separate from and electrically connected to the CSCD 110. The security token 130 may be a server or other type of module that is accessible over the network 160, or it may be a software component resident on the CSCD 110. As another alternative, security token 130 may be distributed over multiple devices, one of which may be the CSCD 110. Also, for example, the security token 130 can encompass a handheld device with no connection to the other noted components, or can encompass a software application running on the CSCD 110.

Accordingly, while at least one embodiment of the present invention is illustrated herein using a security token 130 electrically connected to the CSCD 110, such that the CSCD 110 can read a given token code (or another authentication value) directly from the security token 130, other implementations are within the scope of the present invention (such as radio frequency (RF), infrared, etc.), as would be apparent to a person of ordinary skill in the art. By way of example, for security tokens 130 that are not connectable to a computer or other user device in this manner, the user may manually enter a password or another value displayed by the security token 130 at the time of the attempted access.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the cryptographic information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access-controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token might be required.

Figure 2:
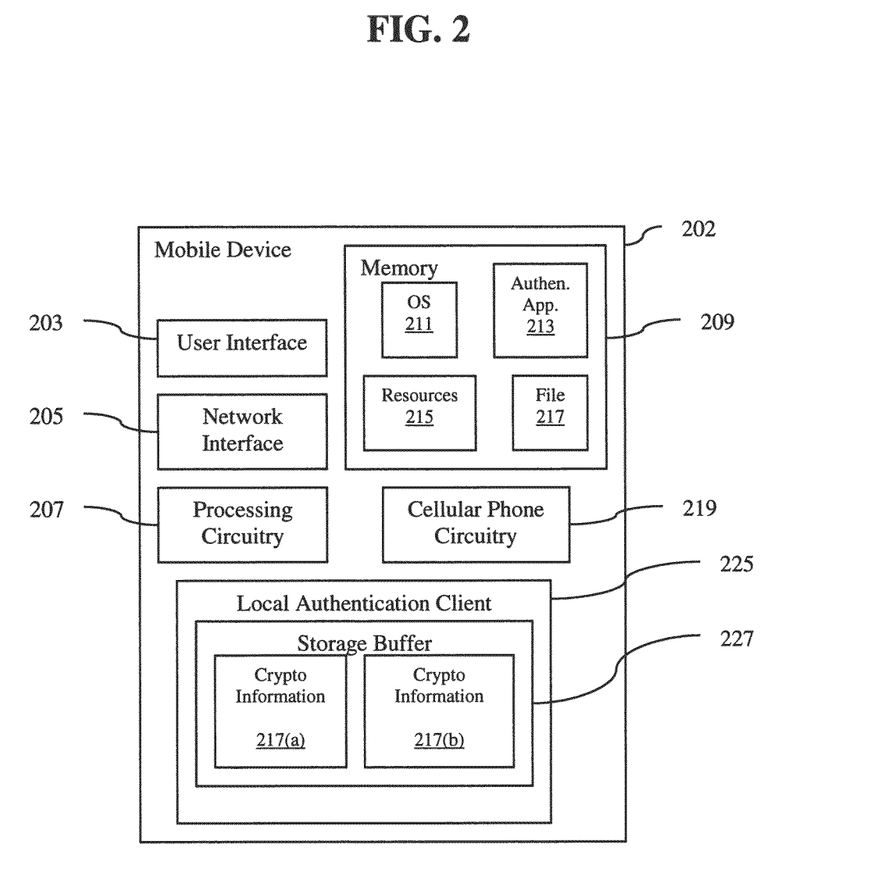
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system (OS) 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(*a*), 217(*b*), etc. from storage buffer 227, as additionally described herein.

It should be appreciated that the processing circuitry 207 can include one or more processors running specialized software components, such as detailed in connection with the techniques detailed herein and further depicted in FIG. 3.

In at least one embodiment of the invention, once the mobile device 202 is able to obtain valid cryptographic information, the user of the mobile device 202 is able to perform local user authentication to access protected resources. Accordingly, as noted, the mobile device 202 is provisioned with the authentication application 213 and cryptographic information file 217 holding pre-determined cryptographic information. For example, and as further detailed in connection with FIG. 3, such pre-determined cryptographic information can include one or more input elements (such as colors, images, characters, etc.). As further described herein, such pre-determined cryptographic information can be learned and updated over time.

Consequently, the processing circuitry 207 of the mobile device 202 can perform a local cryptographic operation using cryptographic information 217 stored in the memory 209. In at least one embodiment of the invention the processing circuitry 207 runs the authentication application 213, which directs the user of the mobile device 202, via the user interface 203, to enter cryptographic information which is captured as one or more input elements 217(*a*), 217(*b*), etc. While the captured cryptographic information 217(*a*) and 217(*b*) are temporarily stored in the storage buffer 227 of the local authentication client 225, the authentication application 213 compares the captured user-provided cryptographic information 217(*a*) and 217(*b*) with the appropriate expected items of cryptographic information from file 217.

If a match is determined via this comparison, the authentication application 213 permits the user to access a protected resource (such as, for example, data in association with element 215 that is stored in the memory 209).

Figure 3:
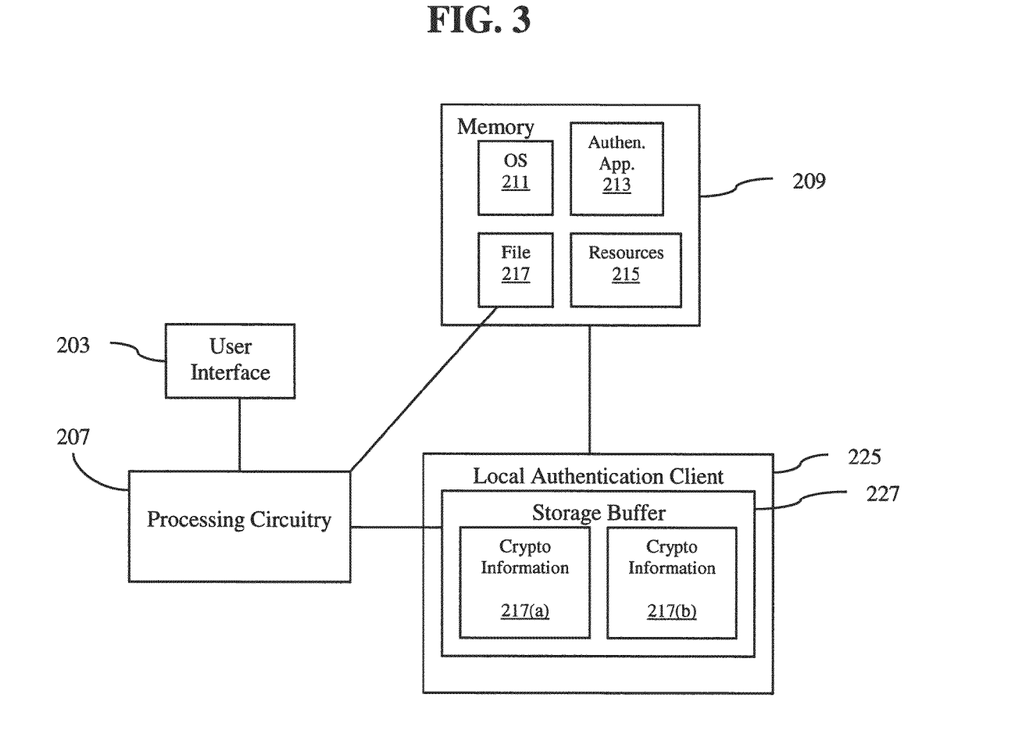
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can enter cryptographic information via user interface 203. This entered cryptographic information is captured as one or more input elements 217(*a*), 217(*b*), etc. Such elements can include, as additionally detailed herein, letters, numbers, characters, symbols, colors, images, etc. Accordingly, the captured one or more input elements 217(*a*), 217(*b*), etc. can be stored in cryptographic information file 217 as the pre-determined cryptographic information for a given cryptographic process.

Consequently, a corresponding cryptographic flow (carried out, for example, by authentication application 213 as run by operating system 211) can take the following exemplary form. The user is prompted (via user interface 203 such as additionally depicted in FIG. 4 through FIG. 7) to enter cryptographic information in connection with an authentication request to access a protected resource associated with the mobile device (for example, the user wishes to access and/or unlock his or her smart phone). The entered cryptographic information is captured by the processing circuitry 207 as one or more input elements 217(*a*) and 217(*b*), which are stored temporarily in the storage buffer 227 of the local authentication client 225.

Subsequently, the authentication application 213 compares the captured user-provided cryptographic information 217(*a*) and 217(*b*) with the pre-determined cryptographic information from file 217 stored in memory 209. If the user-entered input elements 217(*a*) and 217(*b*) match those stored in file 217, authentication is deemed successful and the user is granted access to the protected resource in question.

Figure 4:
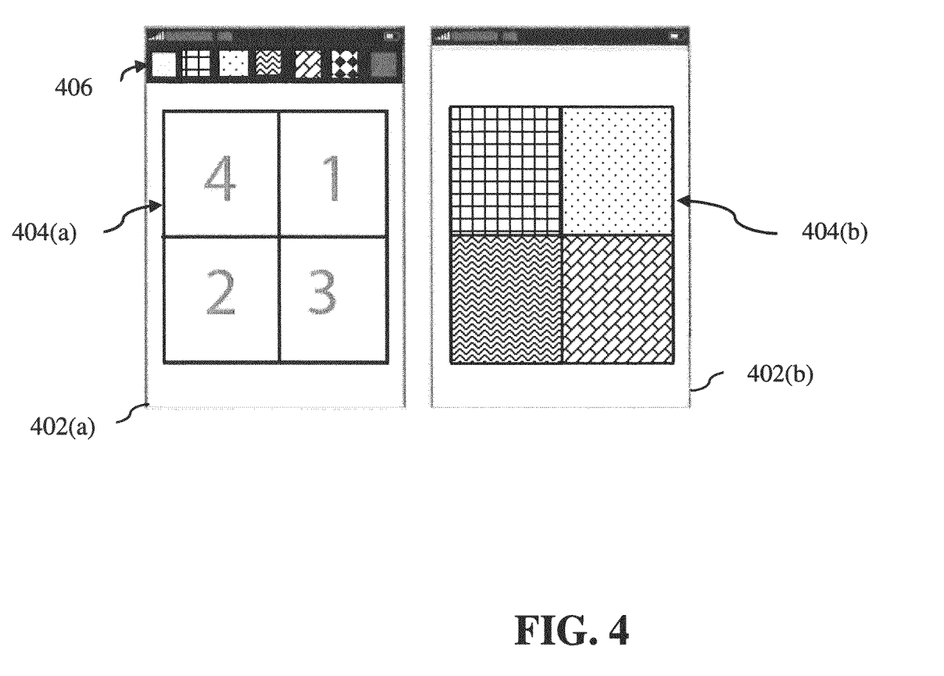
FIG. 4 is a diagram illustrating an example user interface for implementing cryptographic techniques, according to an embodiment of the invention.
Figure 5:
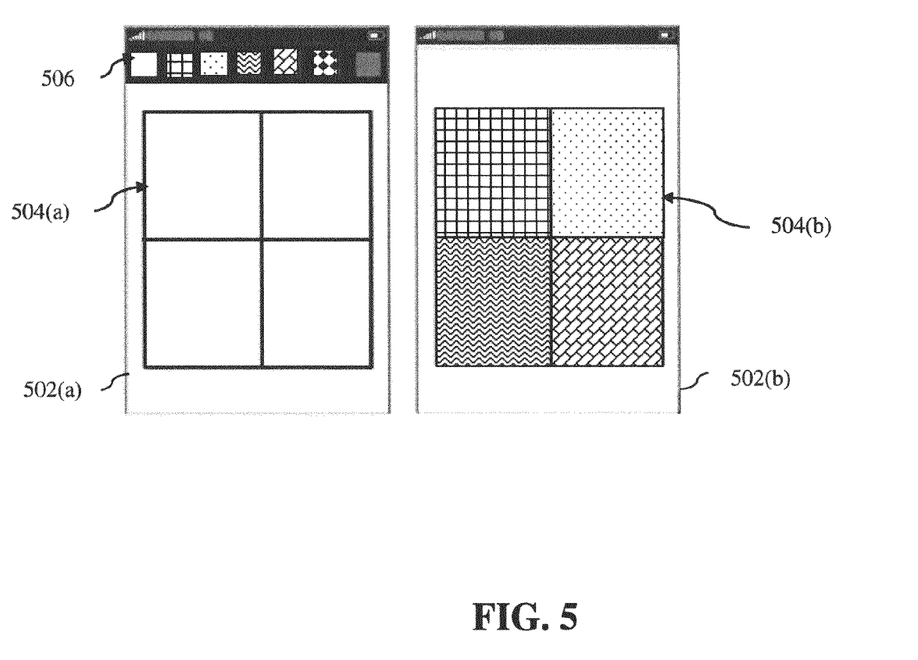
FIG. 5 is a diagram illustrating an example user interface for implementing cryptographic techniques, according to an embodiment of the invention.

As illustrated in the example embodiments depicted in FIG. 4 and FIG. 5, verifying identity of a user can include querying a user, for example, to assign one or more of a small palette of colors to each of multiple colorable regions in a scene. In at least one embodiment of the invention, the users are queried to carry out such assignments in a consistent ordering.

FIG. 4 is a diagram illustrating an example user interface for implementing cryptographic techniques, according to an embodiment of the invention. Specifically, FIG. 4 depicts an enrollment aspect of the invention. By way of illustration, FIG. 4 depicts a mobile device interface 402(a) displaying a 2×2 query grid 404(a), for which a user can select colors and/or shadings from a palette 406 of nine different colors to apply to the four spaces of the query 404(a), thereby serving as a password. In at least one embodiment of the invention, the user is queried to select colors and/or shadings to apply to the four spaces of the query 404(a) in a given order. Additionally, FIG. 4 depicts the mobile device interface 402(b) subsequent to the user selection, with the query spaces 404(b) filled-in with the selected shadings and/or colors.

In an enrollment step such as depicted in FIG. 4, the user will choose a color to associate with each quadrant of the query grid. As each of these selections is a free choice, there are $9^4 = 6561$ different possible colorings. Additionally, in at least one embodiment of the invention, at enrollment time, the sequence in which the quadrants are to be colored can be randomly generated to add an additional layer of entropy. As there are 24 different permutations (given the FIG. 4 example), there can be as many as 157,464 possible ordered colorings. In such a scenario, the user is to memorize the ordering during enrollment, and a training sequence can be implemented during which the user can practice recalling the random ordering and his or her own selected colors.

FIG. 5 is a diagram illustrating an example user interface for implementing cryptographic techniques, according to an embodiment of the invention. Specifically, FIG. 5 depicts an authentication aspect of the invention. By way of illustration, FIG. 5 depicts a mobile device interface 502(a) displaying a 2×2 query 504(a), for which a user can select colors and/or shadings from collection 506 to apply to the four spaces of the query 504(a), as believed by the user to correspond to the enrolled password. In at least one embodiment of the invention, the user is queried to select colors and/or shadings to apply to the four spaces of the query 504(a) in the correct order (that is, the order specified during the enrollment process, such as detailed above in connection with FIG. 4). Additionally, FIG. 5 depicts the mobile device interface 502(b) subsequent to the user selection, with the query spaces 504(b) filled-in with the selected shadings and/or colors, so as to enable authentication.

While the example embodiments depicted in FIG. 4 and FIG. 5 show a 2×2 query grid, it should be appreciated by one skilled in the art that embodiments of the invention are not limited to a 2×2 query grid. It is to be appreciated that a user can be presented with a variety of scenes, shapes and/or figures with colorable regions from which to choose. Additional examples are depicted in FIG. 6 and FIG. 7.

Figure 6:
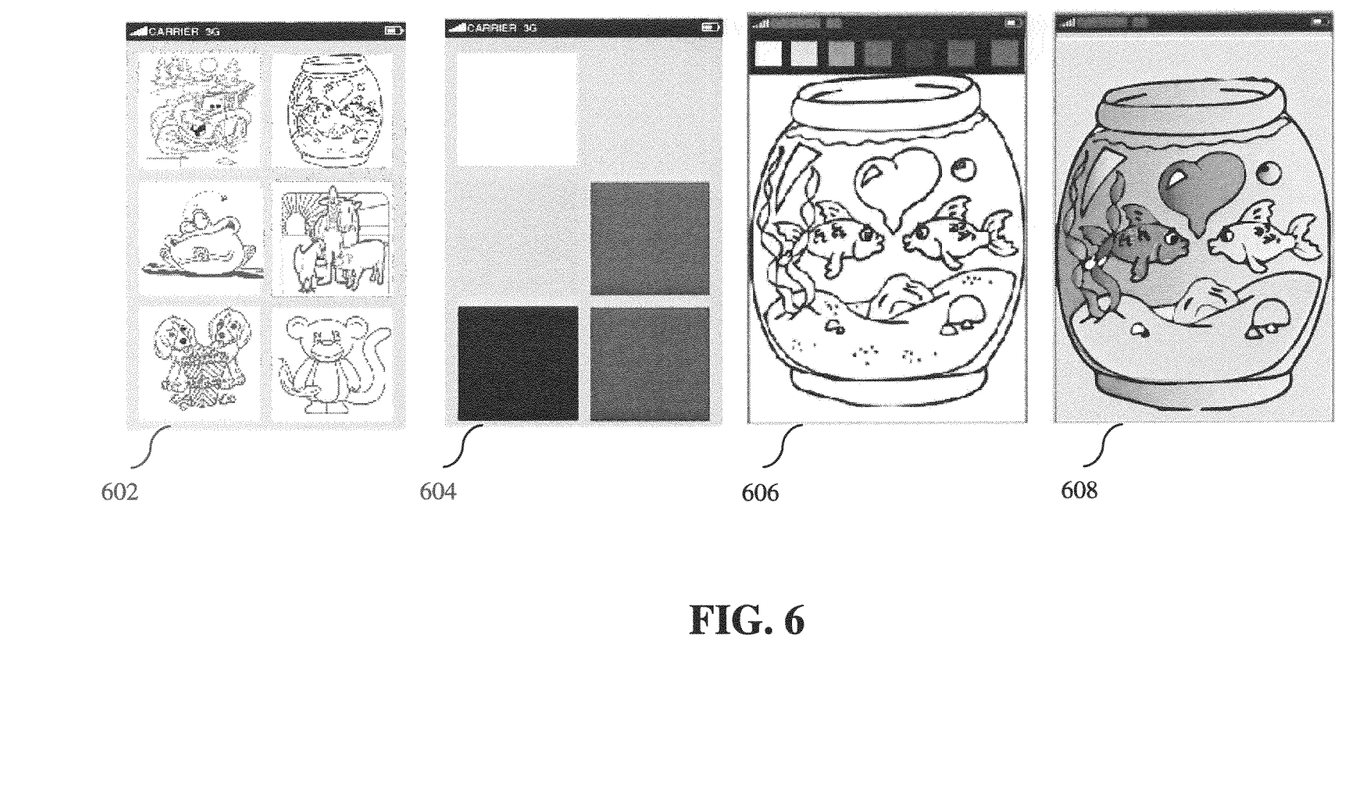
FIG. 6 is a diagram illustrating an example user interface for implementing cryptographic techniques, according to an embodiment of the invention.
Figure 7:
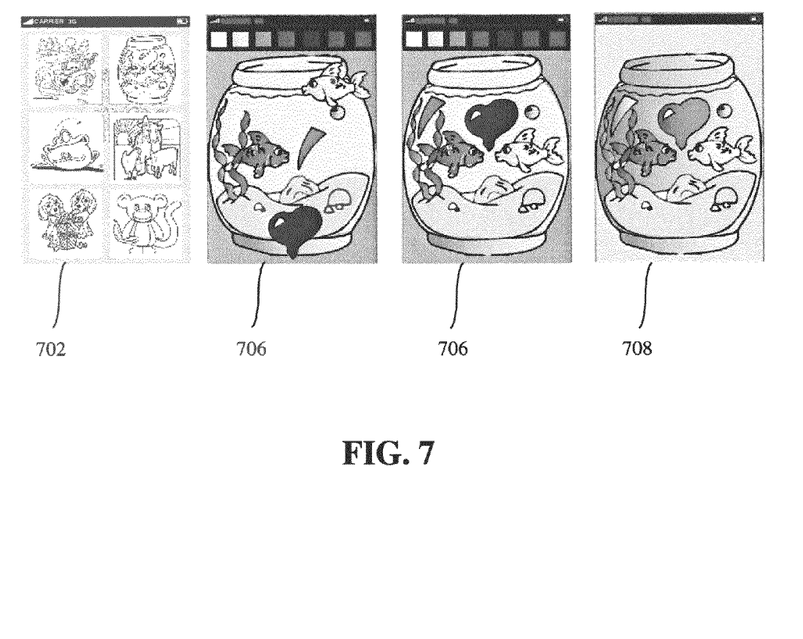
FIG. 7 is a diagram illustrating an example user interface for implementing cryptographic techniques, according to an embodiment of the invention.

FIG. 6 is a diagram illustrating an example user interface for implementing cryptographic techniques, according to an embodiment of the invention. Specifically, FIG. 6 depicts an enrollment aspect of the invention. By way of illustration, FIG. 6 depicts a mobile device interface displaying a query screen 602 for which a user can select a theme from a collection of multiple displayed themes to serve as a password.

Additionally, FIG. 6 depicts the mobile device interface displaying a query screen 604 for which a user can select one or more colors with which to apply to the theme selected via query 602 (to add one or more layers of entropy to the password).

Further, FIG. 6 depicts the mobile device interface displaying a query screen 606 showing the selected theme and offering the user the opportunity to identify one or more portions of the theme to which the one or more colors (selected via query 604) are to be applied (to add one or more additional layers of entropy to the password). Finally, FIG. 6 depicts the mobile device interface displaying a screen 608 that shows the final version of the password; that is, the one or more colors selected via query 604 applied to the theme selected via query 602 in accordance with any instructions provided by the user to query screen 606.

FIG. 7 is a diagram illustrating an example user interface for implementing cryptographic techniques, according to an embodiment of the invention. Specifically, FIG. 7 depicts an authentication aspect of the invention. By way of illustration, FIG. 7 depicts a mobile device interface displaying a query screen 702 for which a user can select a theme from a collection of multiple displayed themes believed to be the enrolled password. Additionally, FIG. 7 depicts the mobile device interface displaying a query screen 704 showing the theme selected via query 702 but with one or more objects within the theme being misplaced and/or being incorrectly colored based on the enrolled password (such as detailed above in connection with FIG. 6).

Further, FIG. 7 depicts the mobile device interface displaying a query screen 706 showing the selected theme and offering the user the opportunity to correct the one or more misplaced and/or incorrectly colored objects within the theme. Finally, FIG. 7 depicts the mobile device interface displaying a screen 708 that shows the correct version of the password that matches the enrolled password, and thereby enables authentication.

As described herein, one or more embodiments of the invention can be parameterized in a variety of different ways. For example, the number of colors in a presented palette can include more or less colors than is illustrated in the above-detailed figures, and the number and colorable regions in a theme can similarly be increased or decreased. Further, the types of themes utilized can include a wide variety of shapes and/or images, including, for instance, still-life images and images composed of randomly-chosen and arranged solids, lines, and shapes.

Figure 8:
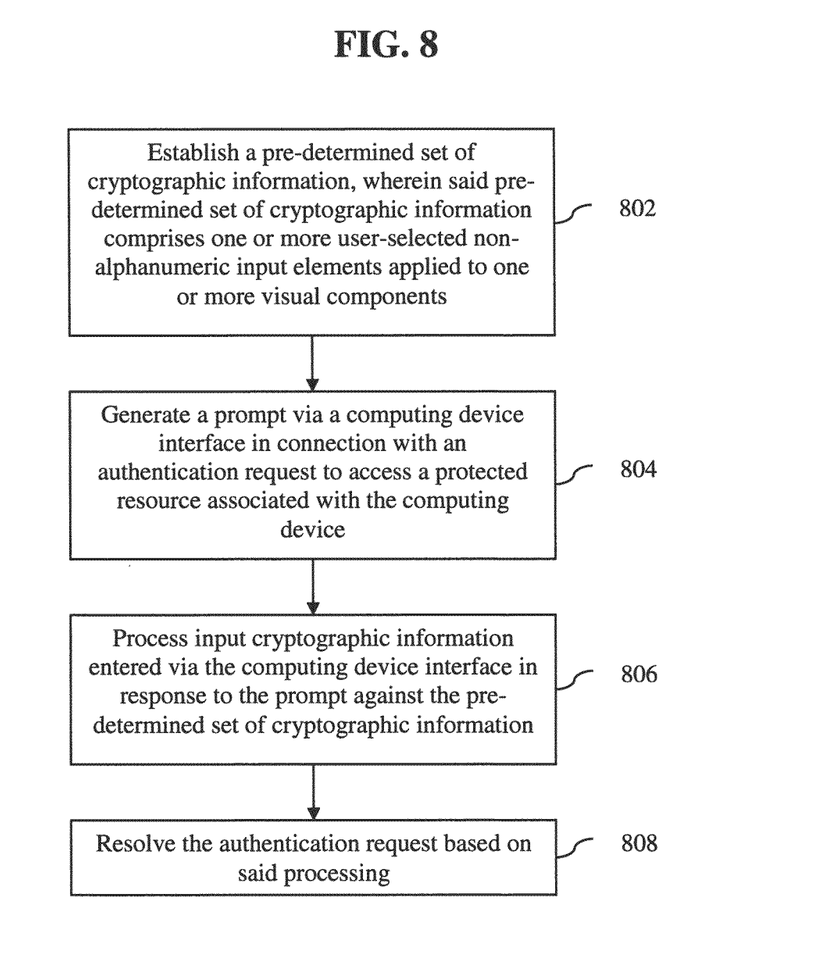
FIG. 8 is a flow diagram illustrating techniques according to an embodiment of the invention.

FIG. 8 is a flow diagram illustrating techniques according to an embodiment of the present invention. Step 802 includes establishing a pre-determined set of cryptographic information, wherein said pre-determined set of cryptographic information comprises one or more user-selected non-alphanumeric input elements applied to one or more visual components. The one or more user-selected non-alphanumeric input elements can include one or more colors, one or more shadings, etc. Also, in at least one embodiment of the invention, the pre-determined set of cryptographic information includes user-selected non-alphanumeric input elements applied to one or more visual components in a particular ordered sequence.

The one or more visual components can include, for example, a character, a symbol, a picture, a photograph, a shape, and/or a combination thereof. Additionally, in at least one embodiment of the invention, the visual component includes an image. The image can include a still-life image and/or an image composed of a set of multiple solids, lines, and shapes that is arranged randomly. Further, an image used in one or more embodiments of the invention can include multiple regions, wherein each of the multiple regions is independently available for application of a user-selected non-alphanumeric input element.

Step 804 includes generating a prompt via a computing device interface in connection with an authentication request to access a protected resource associated with the computing device. Generating the prompt can include displaying a collection of multiple visual components for user selection of one or more of the multiple visual components. Additionally, at least one embodiment of the invention includes displaying a first version of the user-selected one or more visual components, wherein the first version includes one or more inconsistencies as compared to said pre-determined set of cryptographic information. Further, a prompt can be generated via the computing device interface in connection with an opportunity to identify the one or more inconsistencies. In such an embodiment, the inconsistencies can include a color-based inconsistency and/or a configuration-based inconsistency.

Step 806 includes processing input cryptographic information entered via the computing device interface in response to the prompt against the pre-determined set of cryptographic information. In at least one embodiment of the invention, the input cryptographic information includes one or more items of authentication information, and the pre-determined set of cryptographic information includes a set of authentication information.

Step 808 includes resolving the authentication request based on said processing. The resolving step includes granting access to the protected resource associated with the computing device if the input cryptographic information matches the pre-determined set of cryptographic information. Additionally, the resolving step also includes denying access to the protected resource associated with the computing device if the input cryptographic information does not match the pre-determined set of cryptographic information.

Figure 9:
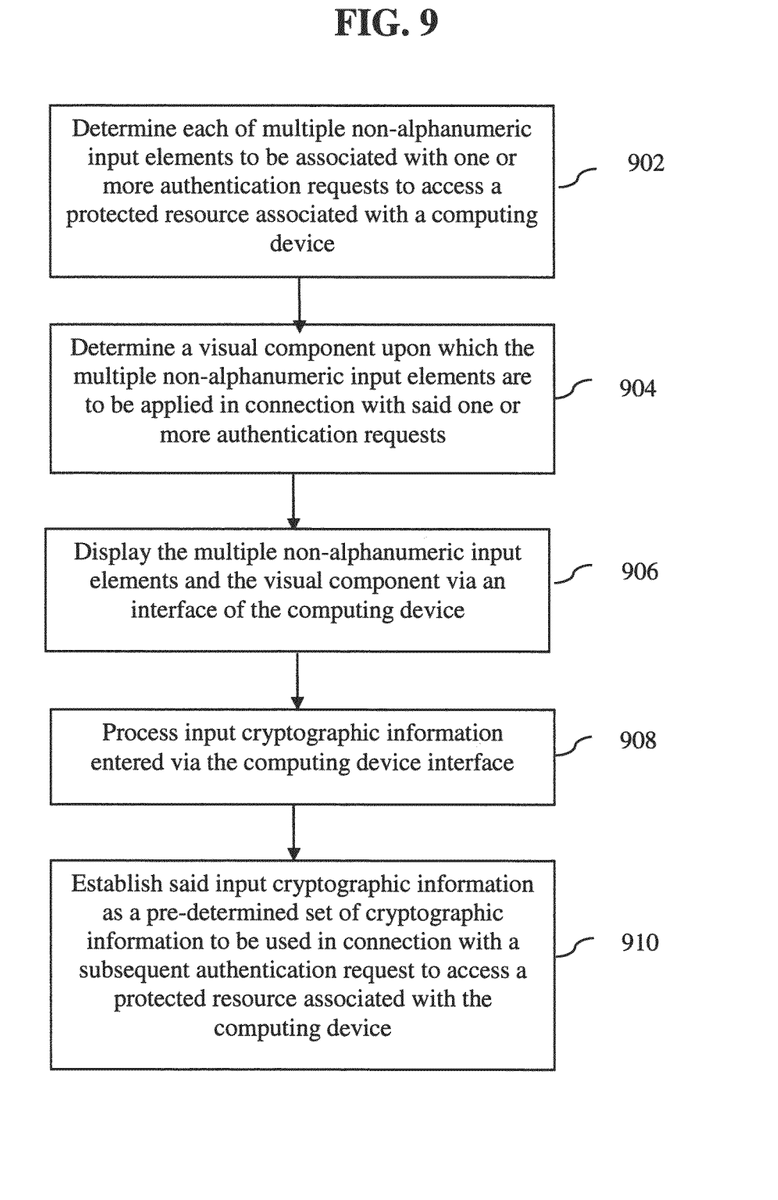
FIG. 9 is a flow diagram illustrating techniques according to an embodiment of the invention.

FIG. 9 is a flow diagram illustrating techniques according to an embodiment of the present invention. Step 902 includes determining each of multiple non-alphanumeric input elements to be associated with one or more authentication requests to access a protected resource associated with a computing device. As detailed herein, the non-alphanumeric input elements can include one or more colors.

Step 904 includes determining a visual component upon which the multiple non-alphanumeric input elements are to be applied in connection with said one or more authentication requests. As detailed herein, the visual component can include at least one of an image a character, a symbol, a picture, a photograph, a shape, and a combination thereof. Step 906 includes displaying the multiple non-alphanumeric input elements and the visual component via an interface of the computing device.

Step 908 includes processing input cryptographic information entered via the computing device interface. As described herein, the input cryptographic information includes (i) selection of one or more of the multiple non-alphanumeric input elements, and (ii) identification of one or more regions of the visual component upon which the one or more selected non-alphanumeric input elements are to be applied. Identification of the regions of the visual component upon which the selected non-alphanumeric input elements are to be applied can additionally include identification of regions of the visual component upon which the selected non-alphanumeric input elements are to be applied in a particular ordered sequence.

Step 910 includes establishing said input cryptographic information as a pre-determined set of cryptographic information to be used in connection with a subsequent authentication request to access a protected resource associated with the computing device.

The techniques depicted in FIG. 8 and FIG. 9 can also include generating a canonical representation of the pre-determined set of cryptographic information, as well as inputting the canonical representation of the pre-determined set of cryptographic information to a key derivation function to generate a cryptographic key. Accordingly, the generated cryptographic key enables one or more cryptographic operations such as decrypting a key store, authenticating to a remote system, etc.

Cryptographic techniques of the type described herein may be implemented in a wide variety of different applications. An additional exemplary communication system application that may incorporate such techniques will now be described with reference to FIG. 10, which includes a communication system 1000 comprising a plurality of mobile telephones 1002-1 and 1002-2 and computers 1004-1, 1004-2 and 1004-3, configured to communicate with one another over a network 1006.

Figure 10:
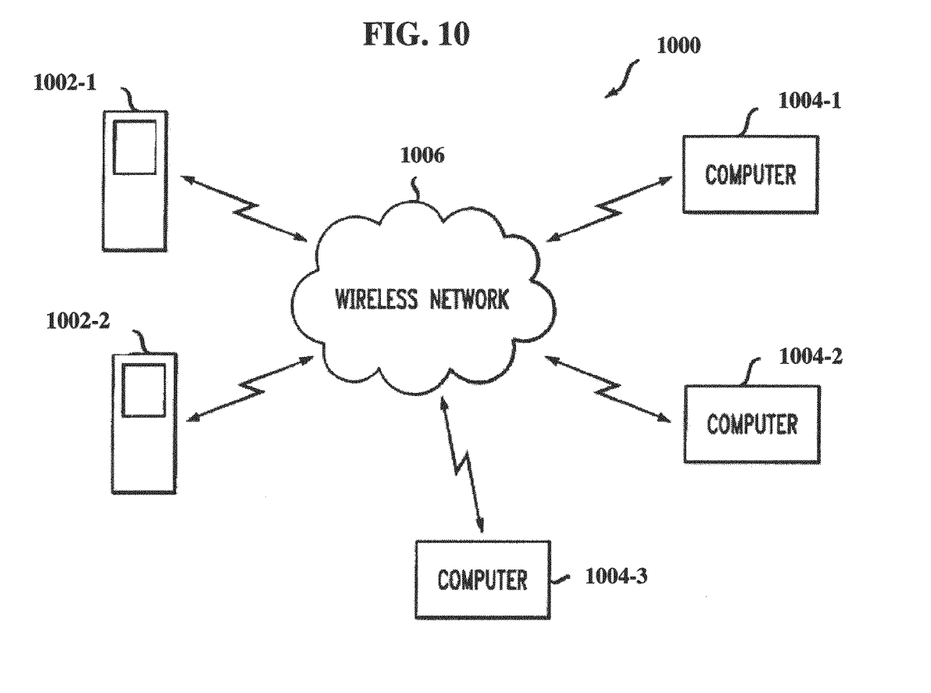
FIG. 10 shows an example embodiment of a communication system that may incorporate functionality of the type illustrated in at least one embodiment of the invention.

Any two or more of the devices 1002 and 1004 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 11:
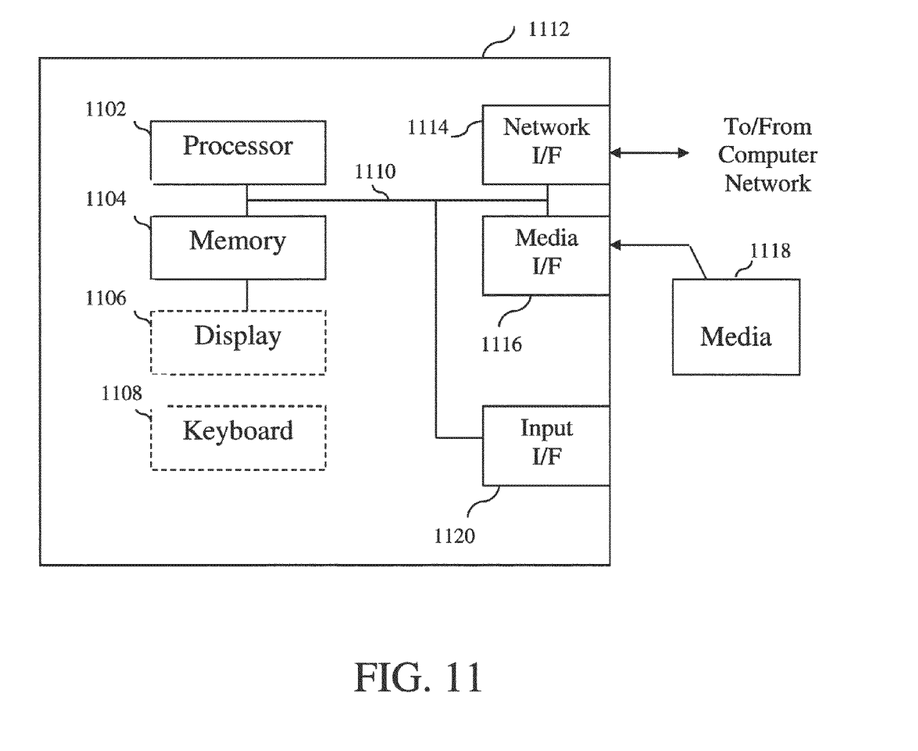
FIG. 11 is a system diagram of an exemplary computer system and/or client-side computing device on which at least one embodiment of the invention can be implemented.

By way of example, an aspect of the present invention can make use of software running on a general purpose computer. For instance, FIG. 11 is a system diagram of an exemplary computer system on which at least one embodiment of the invention can be implemented. As depicted in FIG. 11, an example implementation employs, for example, a processor 1102, a memory 1104, and an input/output interface formed, for example, by a display 1106 and a keyboard 1108. The term "processor" as used herein includes any processing device(s), such as, for example, one that includes a central processing unit (CPU) and/or other forms of processing circuitry. Additionally, the processor 1102 as shown may be viewed as representing, for example, CSCD 110, security token generator 130, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse, touch-screen, etc.) and a mechanism for providing results associated with the processing unit (for example, a printer).

The processor 1102, memory 1104, and input/output interface such as display 1106 and keyboard 1108 can be interconnected, for example, via bus 1110 as part of a data processing unit 1112. Suitable interconnections via bus 1110, can also be provided to an input interface 1120 (such as a touch-screen), a network interface 1114 (such as a network card), which can be provided to interface with a computer network, and to a media interface 1116 (such as a diskette or compact disc read-only memory (CD-ROM) drive), which can be provided to interface with media 1118.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1108, displays 1106, and pointing devices, can be coupled to the system either directly (such as via bus 1110) or through intervening I/O controllers.

Network adapters such as network interface 1114 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1112 as depicted in FIG. 11) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from enhanced security capabilities. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   establishing a pre-determined set of cryptographic information, wherein said pre-determined set of cryptographic information comprises multiple user-selected non-alphanumeric input elements applied to one or more visual components, and wherein:
   said multiple user-selected non-alphanumeric input elements comprise at least two of one or more colors and one or more shadings; and
   said one or more visual components comprise an image, wherein said image comprises multiple regions, and wherein each of the multiple regions is independently associated with one of the at least two of one or more colors and one or more shadings, and wherein each respective one of the at least two of one or more colors and one or more shadings is associated with at least one of the multiple regions of the image;
   generating a prompt via a computing device interface in connection with an authentication request to access a protected resource associated with the computing device;
   processing input cryptographic information entered via the computing device interface in response to the prompt against the pre-determined set of cryptographic information; and
   resolving the authentication request based on said processing;
   wherein said generating, said processing, and said resolving are carried out by the computing device.

2. The method of claim 1, further comprising:
   generating a canonical representation of the pre-determined set of cryptographic information.

3. The method of claim 2, further comprising:
   inputting the canonical representation of the pre-determined set of cryptographic information to a key derivation function to generate a cryptographic key, wherein said cryptographic key enables one or more cryptographic operations.

4. The method of claim 1, wherein said generating the prompt comprises displaying a collection of multiple visual components for user selection of one or more of the multiple visual components.

5. The method of claim 4, further comprising:
   displaying a first version of the user-selected one or more visual components, wherein said first version comprises one or more inconsistencies as compared to said pre-determined set of cryptographic information; and
   generating a prompt via the computing device interface in connection with an opportunity to identify the one or more inconsistencies.

6. The method of claim 5, wherein said one or more inconsistencies comprise at least one of a color-based inconsistency and a configuration-based inconsistency.

7. The method of claim 1, wherein said pre-determined set of cryptographic information comprises the multiple user-selected non-alphanumeric input elements applied to the one or more visual components in a particular ordered sequence.

8. The method of claim 1, wherein said image comprises an image composed of a set of multiple solids, lines, and shapes.

9. The method of claim 1, wherein said resolving comprises:
   granting access to the protected resource associated with the computing device if the input cryptographic information matches the pre-determined set of cryptographic information.

10. An article of manufacture comprising a non-transitory processor-readable storage medium having processor-readable instructions tangibly embodied thereon which, when implemented, cause a processor to carry out the steps of the method of claim 1.

11. An apparatus comprising:
    a memory; and at least one processor coupled to the memory and configured to:
- establish a pre-determined set of cryptographic information, wherein said pre-determined set of cryptographic information comprises multiple user-selected non-alphanumeric input elements applied to one or more visual components, and wherein:
  - said multiple user-selected non-alphanumeric input elements comprise at least two of one or more colors and one or more shadings; and
  - said one or more visual components comprise an image, wherein said image comprises multiple regions, and wherein each of the multiple regions is independently associated with one of the at least two of one or more colors and one or more shadings, and wherein each respective one of the at least two of one or more colors and one or more shadings is associated with at least one of the multiple regions of the image;
- generate a prompt via a computing device interface in connection with an authentication request to access a protected resource associated with the computing device;
- process input cryptographic information entered via the computing device interface in response to the prompt against the pre-determined set of cryptographic information; and
- resolve the authentication request based on said processing of said input cryptographic information.

12. A method comprising:
- determining each of multiple non-alphanumeric input elements to be associated with one or more authentication requests to access a protected resource associated with a computing device, wherein said multiple non-alphanumeric input elements comprise at least two of one or more colors and one or more shadings;
- determining a visual component upon which the multiple non-alphanumeric input elements are to be applied in connection with said one or more authentication requests, wherein said visual component comprises an image, wherein said image comprises multiple regions, and wherein each of the multiple regions is independently available for application of one of the at least two of one or more colors and one or more shadings;
- displaying the multiple non-alphanumeric input elements and the visual component via an interface of the computing device;
- processing input cryptographic information entered via the computing device interface, wherein said input cryptographic information comprises:
  - selection, for each respective one of the multiple regions of the image, of one of the multiple non-alphanumeric input elements to be applied, wherein each respective one of the multiple non-alphanumeric input elements is applied to at least one of the multiple regions of the image; and
- establishing said input cryptographic information as a pre-determined set of cryptographic information to be used in connection with a subsequent authentication request to access the protected resource associated with the computing device;
- wherein said displaying, said processing, and said establishing are carried out by the computing device.

13. The method of claim 12, wherein said selection, for each respective one of the multiple regions of the image, of one of the multiple non-alphanumeric input elements to be applied comprises selection, for each respective one of the multiple regions of the image, of one of the multiple non-alphanumeric input elements to be applied in a particular ordered sequence.

14. The method of claim 12, further comprising:
- generating a canonical representation of the pre-determined set of cryptographic information.

15. The method of claim 14, further comprising:
- inputting the canonical representation of the pre-determined set of cryptographic information to a key derivation function to generate a cryptographic key, wherein said cryptographic key enables one or more cryptographic operations.

16. The method of claim 1, wherein said resolving comprises:
- denying access to the protected resource associated with the computing device if the input cryptographic information does not match the pre-determined set of cryptographic information.

17. The method of claim 8, wherein said set of multiple solids, lines, and shapes is arranged randomly.

18. The method of claim 12, wherein said image comprises an image composed of a set of multiple solids, lines, and shapes.

19. The method of claim 18, wherein said set of multiple solids, lines, and shapes is arranged randomly.

20. An article of manufacture comprising a non-transitory processor-readable storage medium having processor-readable instructions tangibly embodied thereon which, when implemented, cause a processor to carry out the steps of the method of claim 12.

* * * * *